US012591616B2

(12) United States Patent    (10) Patent No.:   US 12,591,616 B2

Jun et al.     (45) Date of Patent:   Mar. 31, 2026

(54) METHOD, SYSTEM AND NON-TRANSITORY COMPUTER-READABLE RECORDING MEDIUM FOR SEARCHING SIMILAR PRODUCTS USING A MULTI TASK LEARNING MODEL

(71) Applicant: MUSINSA Co., Ltd., Seoul (KR)

(72) Inventors: Jae Young Jun, Seoul (KR); Jun Cheol Park, Seoul (KR); Yun Hun Jang, Seoul (KR); Hyung Won Choi, Seoul (KR); Essalim Chahrazad, Seoul (KR)

(73) Assignee: MUSINSA Co., Ltd., Seoul (KR)

( * ) Notice: Subject to any disclaimer, the term of this patent is extended or adjusted under 35 U.S.C. 154(b) by 285 days.

(21) Appl. No.: 18/212,891

(22) Filed: Jun. 22, 2023

(65) Prior Publication Data

US 2024/0037140 A1    Feb. 1, 2024

(30) Foreign Application Priority Data

Jun. 22, 2022   (KR) ........................ 10-2022-0076389

(51) Int. Cl.
| | |
|---|---|
| *G06F 16/583* | (2019.01) |
| *G06F 16/532* | (2019.01) |
| *G06T 7/50* | (2017.01) |
| *G06T 7/70* | (2017.01) |
| *G06T 7/90* | (2017.01) |
| *G06V 10/44* | (2022.01) |
| *G06V 10/80* | (2022.01) |

(52) U.S. Cl.
CPC .......... *G06F 16/583* (2019.01); *G06F 16/532* (2019.01); *G06T 7/50* (2017.01); *G06T 7/70* (2017.01); *G06T 7/90* (2017.01); *G06V 10/44* (2022.01); *G06V 10/806* (2022.01); *G06V 2201/07* (2022.01)

(58) Field of Classification Search
CPC ....... G06F 16/583; G06F 16/532; G06T 7/50; G06T 7/70; G06T 7/90; G06V 10/44; G06V 10/806; G06V 2201/07; G06V 10/751; G06V 10/82
See application file for complete search history.

(56) References Cited

FOREIGN PATENT DOCUMENTS

| | | | | |
|---|---|---|---|---|
| CA | 2605646 A1 | * 11/2006 | .......... | G06T 1/0071 |
| KR | 101639657 B1 | 7/2016 | | |

OTHER PUBLICATIONS

"Jianfeng Dong et. al., Fine-Grained Fashion Similarity Prediction by Attribute-Specific Embedding Learning, Oct. 2021, IEEE Transactions on Image Processing, vol. 30" (Year: 2021).*

"Katrien Laenen et. al., Web Search of Fashion Items with Multimodal Querying, 2018, Proceedings of the Eleventh ACM International Conference on Web Search and Data Mining, pp. 342-350" (Year: 2018).*

* cited by examiner

*Primary Examiner* — Chineyere Wills-Burns
*Assistant Examiner* — Phuong Hau Cai
(74) *Attorney, Agent, or Firm* — Dinsmore & Shohl LLP

(57) ABSTRACT

A method of searching for similar products using a multi-task learning (MTL) model is provided. The method includes converting, by using a multi-task learning model utilizing a unified backbone network, each of a plurality of original images including a fashion item into a single vector including at least two multi-task attributes, and generating a visual search database by storing the original image and the single vector of the original image together.

7 Claims, 6 Drawing Sheets

| Query image | Similar image 1 | Similar image 2 | Similar image 3 | Similar image 4 |
|---|---|---|---|---|

502     504     506     508     510

<u>100</u>

<u>130</u>

Search database management unit — 202

Image receiving unit — 204

Item location detection unit — 206

Intermediate embedding feature vector generation unit — 208

Single vector generation unit — 210

Similar product determination unit — 212

Similar product information provision unit — 214

Communication unit — 216

FIG. 5

| Query image | Similar image 1 | Similar image 2 | Similar image 3 | Similar image 4 |
|---|---|---|---|---|
| 502 | 504 | 506 | 508 | 510 |

METHOD, SYSTEM AND NON-TRANSITORY COMPUTER-READABLE RECORDING MEDIUM FOR SEARCHING SIMILAR PRODUCTS USING A MULTI TASK LEARNING MODEL

CROSS-REFERENCE TO RELATED APPLICATION

This application claims priority to Korean Patent Application No. 10-2022-0076389 filed on Jun. 22, 2022, the entire contents of which are herein incorporated by reference.

TECHNICAL FIELD

The present disclosure relates to a method, a system, and a non-transitory computer-readable recording medium for searching for similar products using a multi-task learning model. Specifically, the present disclosure relates to a method, a system, and a non-transitory computer-readable recording medium for generating a single vector including fashion attributes included in an image using a multi-task learning model in which a unified backbone network is utilized and for searching for similar products using the single vector.

BACKGROUND

Recently, the online market has increased its share of total retail sales, consumers may search for products and decide what they want to buy on their own.

In particular, in an online market that sells fashion products, it is possible to provide consumers with a wide range of choices by providing information on products that they are interested in together with information on similar products. Further, when consumers search for the products they want, it is possible to provide information on products that are similar to the products together to encourage a variety of purchases.

It is generally known that existing similar product search methods provide information by searching for products based on search keywords input by the user. However, in text-based searches, it is difficult to specify detailed styles, total length, patterns, and so on, so the search will also include products that are not similar to the specific clothing users are looking for so that there are limitations to searching for products that are similar to what users are looking for.

In this regard, research is being conducted on how to search for similar products by receiving an image of a product as a query.

For example, Korean Patent No. 10-1639657 discloses a method and search server for searching for similar products based on an image of a product. In the-above related art, attributes are obtained from images of a first product selected by the user, and subsequently attributes are obtained from images of a second product selected by the user to estimate the attributes of interest to the user to search for similar products.

According to such related art, it needs to receive two kinds of product input from the user. Further, such related art has limitations in searching for similar products reflecting various attributes of fashion products. Therefore, the inventors of the present disclosure propose a similar product search technique that reflects various attributes of the product and may be applied to all categories of fashion products.

SUMMARY

One object of the present disclosure is to solve all the above-described problems.

Another object of the present disclosure is to provide a similar product search services that may respond to any category by using a multi-task learning model that shares a unified backbone network in the fashion domain.

Yet another object of the present disclosure is to improve performance of the similar product search services using large databases by optimizing in accordance with the task complexity associated with the features of the attributes.

Representative configurations of the present disclosure to achieve the above objects are described below.

According to one aspect of the present disclosure, there is provided a method of searching for similar products using a multi-task learning (MTL) model, comprising: converting, by using a multi-task learning model utilizing a unified backbone network, each of an original image including a fashion item into a single vector including at least one multi-task attribute; and generating a visual search database by storing the original image and the single vector of the original image together.

According to one embodiment of the present disclosure, the step of converting to a single vector including the at least one multi-task attribute may comprise: detecting a location of a representative item in the original image; generating intermediate embedding feature vectors by embedding vectorizing the representative item in the original image in accordance with the at least one multi-task attribute; and generating one single vector by fusing the intermediate embedding feature vectors.

According to one embodiment of the present disclosure, the step of converting to a single vector including the at least one multi-task attribute may further comprise: weighting the intermediate embedding feature vectors based on the associated multi-task attribute.

According to one embodiment of the present disclosure, the method of searching for similar products using a multi-task learning (MTL) model may further comprise: receiving a query image including a fashion item; detecting a location of a representative item in the query image; converting the representative item in the query image into a query image single vector including at least one multi-task attribute by using the multi-task learning model; calculating a similarity of the query image single vector with each of the single vectors stored in the visual search database; and providing an original image of the single vector stored in the visual search database, which has a similarity satisfying a predetermined criterion.

According to one embodiment of the present disclosure, the step of converting the representative item in the query image into a query image single vector including at least one multi-task attribute by using the multi-task learning model may comprise: generating intermediate embedding feature vectors of the query image by embedding vectorizing representative items of the query image in accordance with at least one multi-task attribute; weighting the intermediate embedding feature vectors of the query image based on the associated multi-task attribute; and generating one single vector by fusing the weighted, intermediate embedding feature vector of the query image.

According to one embodiment of the present disclosure, the multi-task attribute may include an article representing a feature of the fashion item. In one embodiment, if the fashion item is a clothing, the multi-task attribute may include at least one of a category, a length, a sleeve length, a pattern, a style, a shape, a color, a material, a fit, a detail, and a neckline. In one embodiment, if the fashion item is a shoe, the multi-task attribute may include at least one of a heel height, a heel shape, a forefoot shape, and a sole shape.

According to another aspect of the present disclosure, there is provided a system for searching for similar products using a multi-task learning (MTL) model. comprising: an image receiving unit configured to receive an original image and a query image including a fashion item; an item location detection unit configured to detect a location of a representative item in the original image and the query image; an intermediate embedding feature vector generation unit configured to generate an intermediate embedding feature vector by embedding vectorizing in accordance with at least one multi-task attribute, by using a multi-task learning model utilizing a unified backbone network, for the representative item in the original image and the representative item in the query image; a single vector generation unit configured to generate one single vector by weighting the intermediate embedding feature vectors of the original image and the query image based on the complexity of the associated multi-task attributes and fusing the intermediate embedding feature vectors; a similar product determination unit configured to calculate a similarity between the single vector stored in the visual search database and the single vector of the query image, select a single vector stored in the visual search database, which has a similarity satisfying a predetermined criterion, and determine an original image of the selected single vector as a similar product image to the query image; and a similar product information provision unit configured to provide information on a fashion item included in the similar product image.

In addition, there are further provided other methods and systems to implement the present disclosure, as well as non-transitory computer-readable recording media having stored thereon computer programs for executing the methods.

According to the present disclosure, it is possible to provide a similar product search service that may respond to any category by using a multi-task learning model that shares a unified backbone network in the fashion domain.

Further, according to the present disclosure, it is possible to improve the performance of a similar product search service using a large database by optimizing in accordance with the task complexity associated with the features of the attributes.

BRIEF DESCRIPTION OF THE DRAWINGS

FIG. 5 illustratively shows an input query image and images of similar products searched from a visual search database according to one embodiment of the present disclosure.

DETAILED DESCRIPTION

Hereinafter, embodiments of the present disclosure will be described in detail with reference to the accompanying drawings. In the following, specific descriptions of functions and configurations already known in the art are omitted if it is deemed that they may unnecessarily obscure the essence of the present disclosure. In addition, it is to be understood that the following description relates merely to one embodiment of the present disclosure and is not intended to limit the present disclosure.

The terms used in the present disclosure are used merely to describe specific embodiments and are not intended to limit the present disclosure. For example, a component expressed in the singular is to be understood as including a plurality of components unless the context clearly indicates that the singular is intended. It is to be understood that the term "and/or" as used in this disclosure is intended to encompass any and all possible combinations of one or more of the enumerated items. The terms "include" or "have" as used in the present disclosure are intended merely to designate the presence of the features, numbers, operations, components, parts, or combinations thereof described herein, and the use of such terms is not intended to exclude the possibility of the presence or addition of one or more other features, numbers, operations, components, parts, or combinations thereof.

In some embodiments of the present disclosure, a 'module' or 'unit' refers to a functional unit that performs at least one function or operation, and may be implemented in hardware or software, or a combination of hardware and software. Furthermore, a plurality of 'modules' or 'units' may be integrated into at least one software module and implemented by at least one processor, with the exception of 'modules' or 'units' that need to be implemented in specific hardware.

Further, unless otherwise defined, all terms used in this disclosure, including technical or scientific terms, may have the same meaning as commonly understood by one of ordinary skill in the art to which the present disclosure belongs. It is to be understood that commonly used dictionary-defined terms should be construed to have a meaning consistent with their contextual meaning in the relevant art and are not to be construed as unduly limiting or expanding unless expressly defined otherwise in the present disclosure.

Hereinafter, a method for automated extraction of image data features according to one embodiment of the present disclosure will be described in detail with reference to the following drawings.

Figure 1:
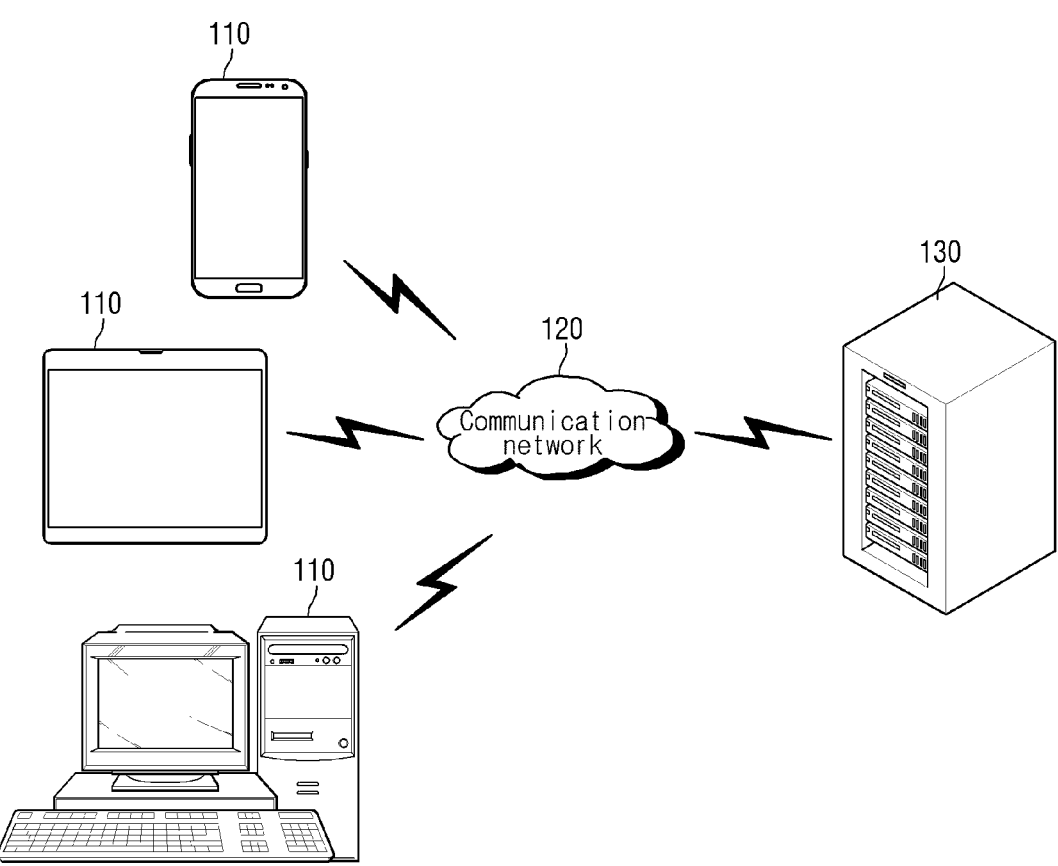
FIG. 1 illustratively shows a schematic configuration of a system environment for providing a similar product search service according to one embodiment of the present disclosure.

FIG. 1 illustratively shows a schematic configuration of a system environment for providing a similar product search service according to one embodiment of the present disclosure.

As shown in FIG. 1, a similar product search system 100 according to one embodiment of the present disclosure may include a plurality of user terminals 110, a communication network 120, and a similar product search server 130.

The user terminal 110 according to one example embodiment of the present disclosure is a digital device that includes the capability to access and communicate with the similar product search server 130 via the communication network 120. The user terminal 110 may be a portable digital device having memory means and computing capability by means of a microprocessor, such as a smartphone, tablet PC, or the like, and is not limited to any particular form. Three user terminals are illustrated in the drawings, but the present disclosure is not limited thereto.

According to one embodiment of the present disclosure, various forms of user input received on the user terminal 110 may be communicated to the similar product search server 130 via the communication network 120. According to one embodiment of the present disclosure, the user terminal 110 may receive various signals transmitted from an external source (e.g., the similar product search server 130) via the communication network 120.

According to one embodiment of the present disclosure, the user terminal 110 may include an application to support functionality according to the present disclosure. Such an application may be downloaded from the similar product search server 130 or an external application distribution server (not shown).

The communication network 120 according to one embodiment of the present disclosure may include any communication modality, such as wired communication or wireless communication, and may include various communication networks, such as a local area network (LAN), a metropolitan area network (MAN), or a wide area network (WAN). Preferably, the communication network 120 referred to herein may be the public Internet or the World Wide Web (WWW). However, the communication network 120 may also include, at least in part, a publicly available wired or wireless data communication network, a publicly available telephone network, or a publicly available wired or wireless television communication network, without necessarily being limited thereto.

For example, the communication network 120 may be a wireless data communication network, implementing, at least in part, a communication method in the related art such as Wireless fidelity (WiFi) communication, WiFi-Direct communication, Long Term Evolution (LTE) communication, 5 Generation (5G) communication, Bluetooth communication (including Bluetooth Low Energy (BLE) communication), infrared communication, ultrasonic communication, or the like. In another example, the communication network 120 may be an optical communication network that implements, at least in part, a communication method in the related art such as light fidelity (LiFi) or the like.

The similar product search server 130 according to one example embodiment of the present disclosure may generate a certain visual search database, and search the visual search database for products similar to a certain query image and provide them. In one embodiment, the similar product search server 130 may generate a single vector including fashion attributes embedded in the image by using a multi-task learning model utilizing a unified backbone network, and compare it to search for similar products. In one embodiment, the similar product search server 130 may communicate with the user terminal 110 via the communication network 120, as shown.

In one embodiment of the present disclosure, the other similar product search server 130 may be a digital device having memory means and a microprocessor having computing capabilities. Such a similar product search server 130 may be a server system.

Figure 2:
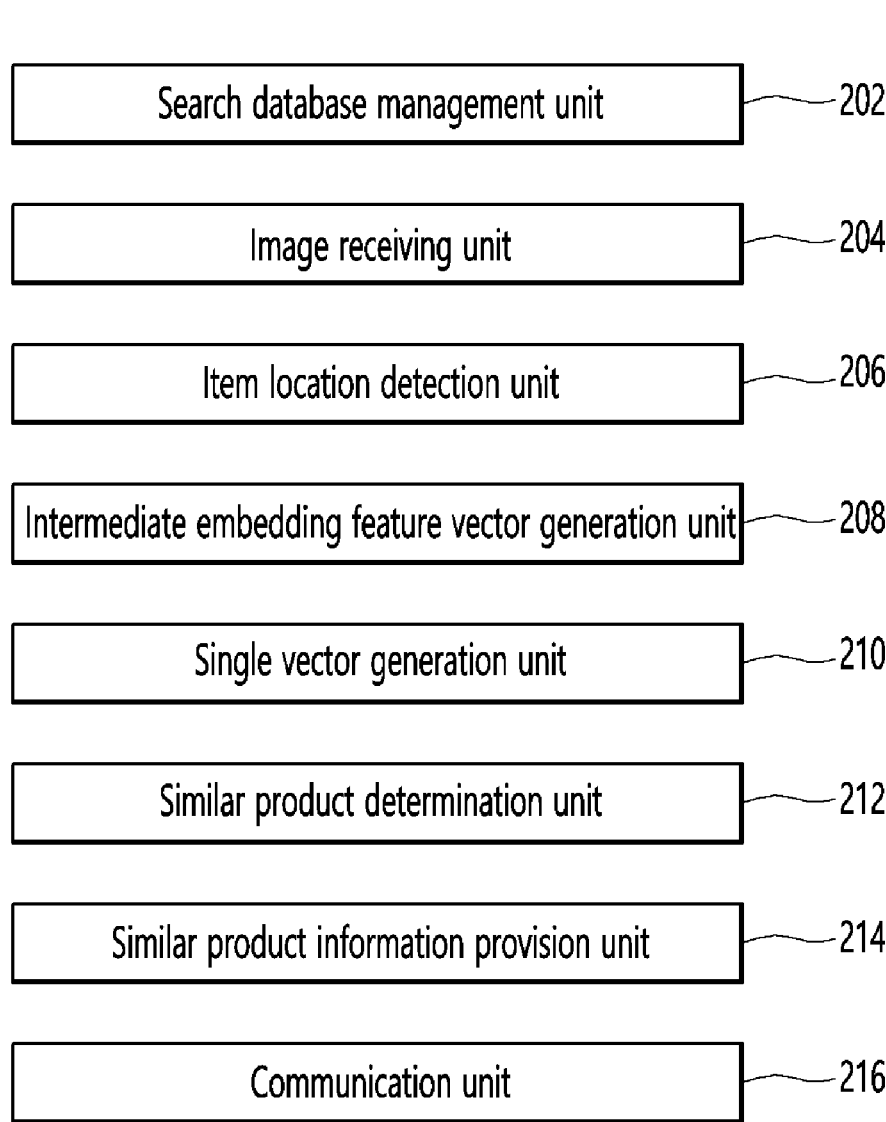
FIG. 2 is a block diagram schematically illustrating a functional configuration of a similar product search server according to one embodiment of the present disclosure.

FIG. 2 is a block diagram schematically illustrating a functional configuration of a similar product search server according to one embodiment of the present disclosure.

Referring to FIG. 2, the similar product search server 130 may include a search database management unit 202, an image receiving unit 204, an item location detection unit 206, an intermediate embedding feature vector generation unit 208, a single vector generation unit 210, a similar product determination unit 212, a similar product information provision unit 214, and a communication unit 216. The components illustrated in FIG. 2 are not intended to be exhaustive of the functionality of the similar product search server 130, nor are they required, and the similar product search server 130 may include more or fewer components than those illustrated.

According to one embodiment of the present disclosure, the search database management unit 202, the image receiving unit 204, the item location detection unit 206, the intermediate embedding feature vector generation unit 208, the single vector generation unit 210, the similar product determination unit 212, the similar product information provision unit 214, and the communication unit 216 may be program modules, at least some of which communicate with an external system. These program modules may be included in the similar product search server 130 in the form of operating systems, application modules, or other program modules, and may be physically stored in various public memory devices. Further, such program modules may be stored on a remote memory device that is in communication with the similar product search server 130. Such program modules may include, but are not limited to, routines, subroutines, programs, objects, components, data structures, and the like that perform certain tasks or execute certain abstract data types to be described later in accordance with the present disclosure.

According to one embodiment of the present disclosure, the search database management unit 202 may perform a function of storing and managing a visual search database in which similar products may be searched. Here, the visual search database may be a database that stores a certain original image and a vector value including information on the original image together.

According to one embodiment of the present disclosure, the search database management unit 202 may store a single vector including fashion attribute information for the original image as a search database. According to one embodiment, the search database management unit 202 may store data in the form of a single vector for an image generated through a series of processing operations in the image receiving unit 204, the item location detection unit 206, the intermediate embedding feature vector generation unit 208, and the single vector generation unit 210, in a visual search database.

According to one embodiment of the present disclosure, the search database management unit 202 may provide the similar product determination unit 212 with data in the form of a single vector stored in the visual search database. According to one embodiment of the present disclosure, the search database management unit 202 may provide the similar product information provision unit 214 with the original image of the single vector stored in the visual search database.

According to one embodiment of the present disclosure, the image receiving unit 204 may perform a function of receiving a certain image. In one embodiment, the image receiving unit 204 may receive a certain image including at least one fashion item. According to one embodiment of the present disclosure, the image receiving unit 204 may collect a predetermined original image. In one embodiment, the image receiving unit 204 may receive an original image including the at least one fashion item from an online marketplace or social network system (SNS).

In one embodiment of the present disclosure, the image receiving unit 204 may receive a query image. In one embodiment, the image receiving unit 204 may receive a query image including at least one fashion item from the user terminal.

According to one embodiment of the present disclosure, the item location detection unit 206 may perform a function of detecting a location of a representative item in the received image. In one embodiment of the present disclosure, the item location detection unit 206 may detect a location of a representative item in each of the original image and the query image. In one embodiment, the item location detection unit 206 may detect a location of a representative item in the received image by receiving input. In another embodiment, the item location detection unit 206 may select a random item as a representative item in an image including a plurality of fashion items and detect a location of the selected item.

According to one embodiment of the present disclosure, the intermediate embedding feature vector generation unit 208 may perform a functions of generating an intermediate embedding feature vector by embedding the image into a vector. Here, the intermediate embedding feature vector is a vector whose components include values representing multi-task attributes for the image. In one embodiment of the present disclosure, the intermediate embedding feature vector may be a feature vector whose component values are fashion attributes of a representative item included in the image. In one embodiment of the present disclosure, the multi-task attributes may include articles representing features of the fashion items included in the image. In one embodiment, if the representative item is a clothing, the fashion attributes may include category, length, sleeve length, pattern, style, shape, color, material, fit, detail, neckline, and the like. In one embodiment, if the representative item is a shoe, the fashion attributes may include heel height, heel shape, forefoot shape, sole shape, and the like. Further, the fashion attributes may include their own characteristic attributes in case of the representative item is a bag, an accessory, miscellaneous goods, or a hat. In one embodiment of the present disclosure, the intermediate embedding feature vector generation unit 208 may generate at least two intermediate embedding feature vectors, each with information about attributes of a representative item included in the image as a vector component.

In one embodiment of the present disclosure, the intermediate embedding feature vector generation unit 208 may generate intermediate embedding feature vectors of different sizes based on the complexity of the respective fashion attributes. For example, because the task of distinguishing a category of an item is more complex than the task of distinguishing a color of an item, the intermediate embedding feature vector generation unit 208 may construct a larger intermediate embedding feature vector for the category than for the color.

According to one embodiment of the present disclosure, the single vector generation unit 210 may perform a function to generate a single vector that comprehensively represents an attribute for the corresponding image by combining the at least one intermediate embedding feature vector. Here, the single vector may be a vector of information on a fashion item included in the image, positioned in a style space, representing each attribute of the item. In one embodiment, the single vector may be generated by fusing each of the intermediate embedding feature vectors generated by the intermediate embedding feature vector generation unit 208.

According to one embodiment of the present disclosure, the single vector generation unit 210 may weight each of the intermediate embedding feature vectors based on the associated multi-task attribute. In one embodiment, the single vector generation unit 210 may weight each of the intermediate embedding feature vectors based on the complexity of the associated multi-task attribute. In one embodiment, the complexity of the associated multi-task attributes may vary depending on the attribute information corresponding to each component of the intermediate embedding feature vector, and the intermediate embedding feature vector generation unit 208 may weight the intermediate embedding feature vector based on such complexity. For example, the single vector generation unit 210 may weight the intermediate embedding feature vectors for item and category, which have more complex task attributes, more heavily than the intermediate embedding feature vectors for color, and fuse the intermediate embedding feature vectors to generate a single vector.

According to one embodiment of the present disclosure, the similar product determination unit 212 may perform a function of determining a visual search database image including a fashion item similar to a fashion item included in the query image as a similar product image. According to one embodiment of the present disclosure, the similar product determination unit 212 may compare a single vector of the query image with each single vector stored in the visual search database, and determine an image having the single vector that satisfies a predetermined criterion as a similar product image to the query image.

In one embodiment of the present disclosure, the similar product determination unit 212 may calculate a similarity between the query image and the visual search database images. According to one embodiment of the present disclosure, the similar product determination unit 212 may calculate the similarity by comparing a single vector of the query image to a single vector for each image in the visual search database. In one embodiment, the similar product determination unit 212 may calculate the similarity by comparing the distance of the single vector for the query image to the single vector for each image in the visual search database in style space.

In one embodiment of the present disclosure, the similar product determination unit 212 may select an original image for a single vector with a similarity that satisfies a predetermined criterion as a similar product image for the query image. In one embodiment of the present disclosure, the similar product determination unit 212 may select a single vector as the single vector for the similar product image if the similarity between the single vector in the visual search database and the single vector in the query image meets the predetermined criteria.

In one embodiment of the present disclosure, the similar product information provision unit 214 may perform a function of providing information of an item among images in the visual search database that includes an item similar to a fashion item included in the query image. In one embodiment of the present disclosure, the similar product information provision unit 214 may provide information of a fashion item included in the similar product image for the query image. In one embodiment, the similar product information provision unit 214 may provide the original image of the selected similar product image together with the sales information of the fashion item included in the image.

In one embodiment of the present disclosure, the similar product information provision unit 214 may sort the single vectors in the visual search database in order of increasing similarity with the single vector of the query image, and provide information on similar product images and the fashion items included in those images. In one embodiment, the similar product information provision unit 214 may provide information about similar products by sorting the similar product images for the query image by the popularity of sales on the online market. Alternatively, the similar product information provision unit 214 may provide information on similar products by various sorting criteria.

The communication unit 216 of the similar product search server 130 according to one embodiment of the present disclosure may perform a function to enable data transmission and reception from/to the search database management unit 202, the image receiving unit 204, the item location detection unit 206, the intermediate embedding feature vector generation unit 208, the single vector generation unit 210, the similar product determination unit 212, and the similar product information provision unit 214.

Similar product search server 130 according to one embodiment of the present disclosure may generate intermediate embedding feature vectors for attributes of fashion items included in original images and query images, by using a multi-task learning model sharing a unified backbone network, and fuse the intermediate embedding feature vectors into a single vector. According to the present disclosure, which uses a multi-task learning model to generate a single vector including various attribute features and uses it to search for similar products, it is advantageous to be able to use correlations between different fashion attributes and to check detailed features of a fashion item rather than merely overall features, compared to a method in the related art using a single task. For example, when comparing the similarity of items, the category, shape, and color features of the items may be compared collectively to determine similarity. A single vector including all of the different attributes, such as in one embodiment of the present disclosure, may correspond to any category of items, and more detailed attributes may be learned to improve similar product search performance. Further, according to one embodiment of the present disclosure, the similar product search server 130 has the advantage of easily scaling up as the search database grows by minimizing and weighting the intermediate embedding feature vectors for the attributes of the fashion items in accordance with the complexity of the multi-task attributes, that is, the task difficulty.

Figure 3:
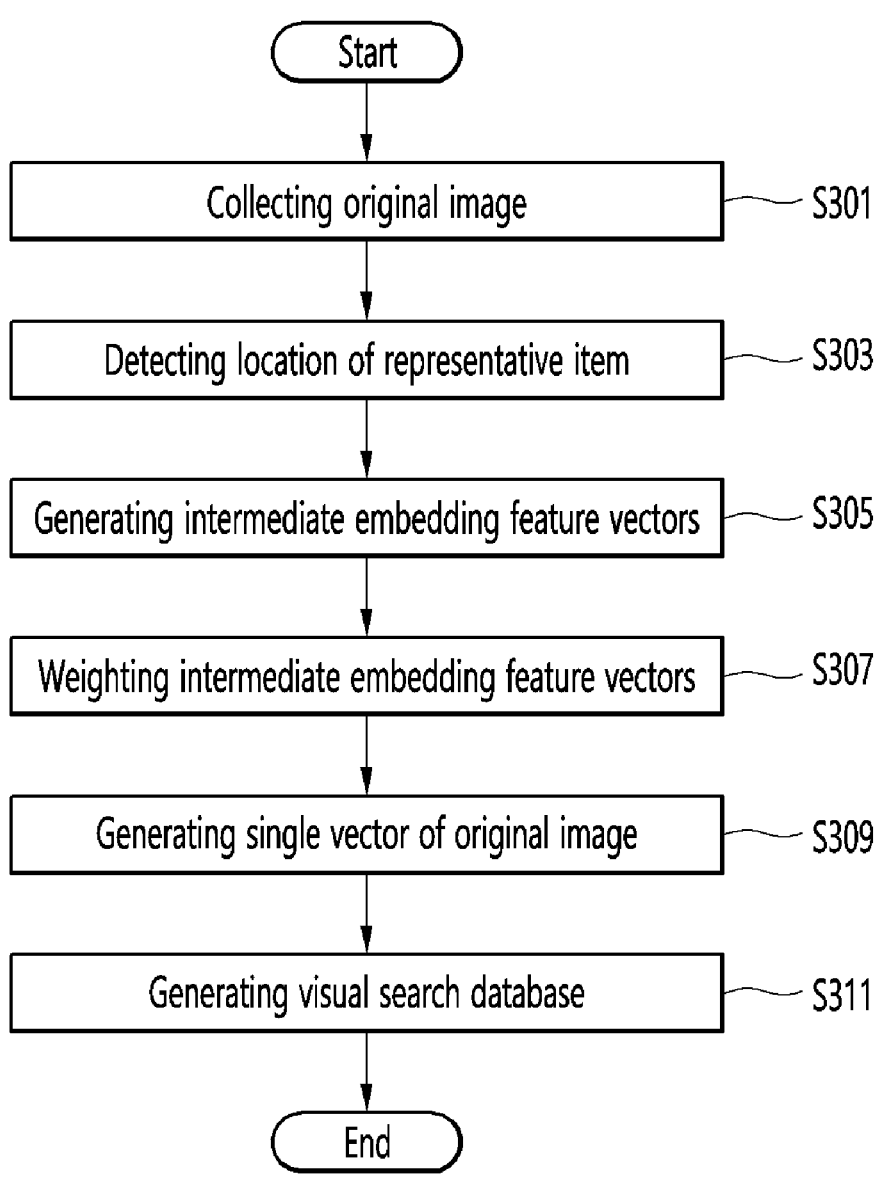
FIG. 3 is a flow diagram illustrating a process of composing a visual search database according to one embodiment of the present disclosure.

FIG. 3 is a flow diagram illustrating a process of configuring a visual search database according to one embodiment of the present disclosure.

First, in a step S301, the similar product search server 130 may collect an original image. In one embodiment, the similar product search server 130 may collect original images including at least one fashion item. In one embodiment of the present disclosure, the similar product search server 130 may collect original image including the at least one fashion item from an online marketplace or social networking system.

In a step S303, the similar product search server 130 may detect a location of a representative item in the collected original image. In one embodiment of the present disclosure, the similar product search server 130 may select one of the fashion items included in the original image as the representative item and detect its location. In one embodiment, the similar product search server 130 may receive input of a representative item for the original image and detect its location.

In a step S305, the similar product search server 130 may generate intermediate embedding feature vectors by embedding representative items in the original image. In one embodiment, the intermediate embedding feature vectors may be generated with fashion attributes of the representative items included in the original image as component values.

Next, in a step S307, the similar product search server 130 may assign weights to the intermediate embedding feature vectors generated for the representative items in the original image. In one embodiment, based on the complexity of the multi-task attributes associated with each of the intermediate embedding feature vectors, a greater weight may be given to the intermediate embedding feature vector having a higher complexity of the multi-task attributes.

In a step S309, the similar product search server 130 may generate one single vector by fusing each of the weighted intermediate embedding feature vectors.

Finally, in a step S311, a visual search database may be generated by storing a single vector for each of the original images. In one embodiment, the visual search database may store each of the original images and the single vector for the original image in pairing.

Figure 4:
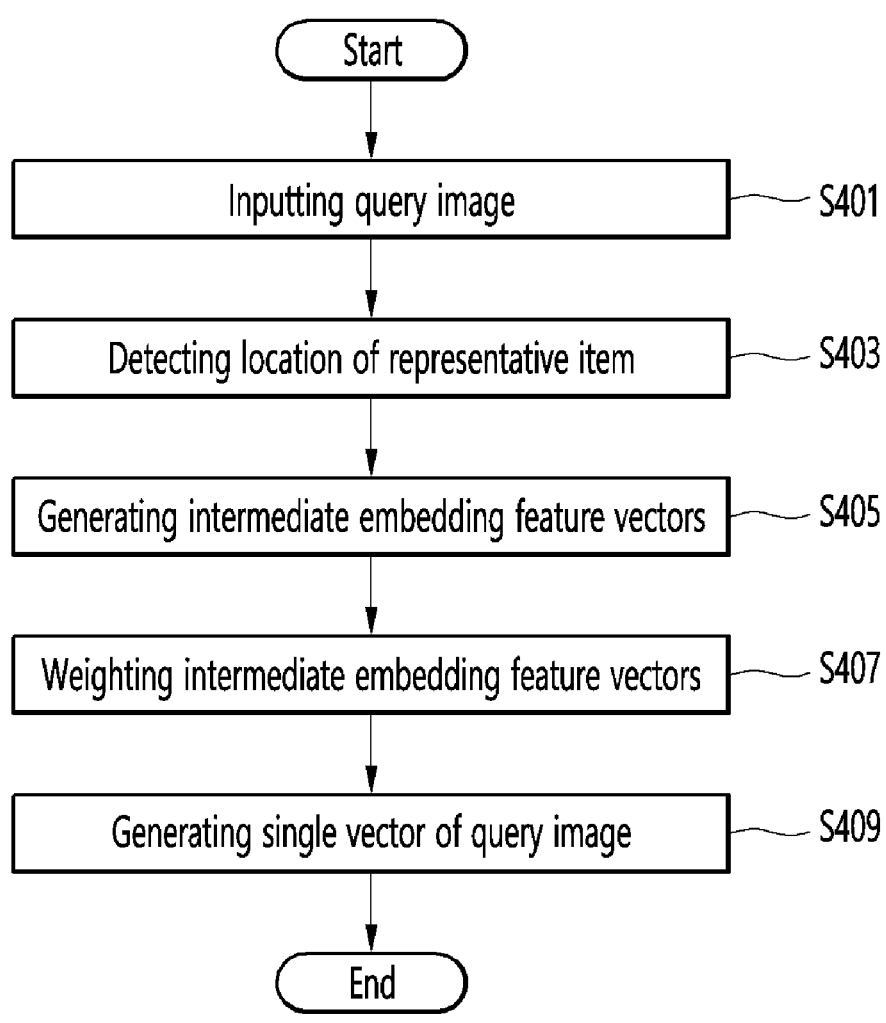
FIG. 4 is a flow diagram illustrating a process of generating a single vector for a query image according to one embodiment of the present disclosure.

FIG. 4 is a flow diagram illustrating a process of generating a single vector for a query image according to one embodiment of the present disclosure.

In one embodiment of the present disclosure, the process of generating a single vector for a query image may be the same as the process of generating a single vector for an original image to construct a visual search database.

First, in a step S401, the similar product search server 130 may receive an input of a query image. In one embodiment, the similar product search server 130 may receive input for a query image including at least one fashion item from the user terminal. In a step S403, the similar product search server 130 may detect a location of a representative item in the query image. In one embodiment, the similar product search server 130 may receive input of a representative item of the query image and detect its location. Next, in a step S405, the similar product search server 130 may generate intermediate embedding feature vectors by embedding a representative item of the query image. In one embodiment, the intermediate embedding feature vectors may be generated with fashion attributes of the representative item as component values. In a step S405, the similar product search server 130 may assign weights to the intermediate embedding feature vectors based on the associated complexity of the multi-task attributes, and finally in a step S407, the weighted intermediate embedding feature vectors are fused to generate a single vector for the query image.

FIG. 5 illustratively shows an input query image and images of similar products searched from a visual search database according to one embodiment of the present disclosure.

Referring to FIG. 5, the similar product search server 130 may receive the query image 502, generate a single vector for the query image 502 using a multi-task learning model, calculate a similarity to the single vector in the visual search database, select the images 504 to 510 corresponding to the single vector satisfying the predetermined criteria as similar products and provide information. In one embodiment, the similar product search server 130 may sort them in order of increasing similarity to the single vector of the query image 502 and provide information on the similar products.

Figure 6:
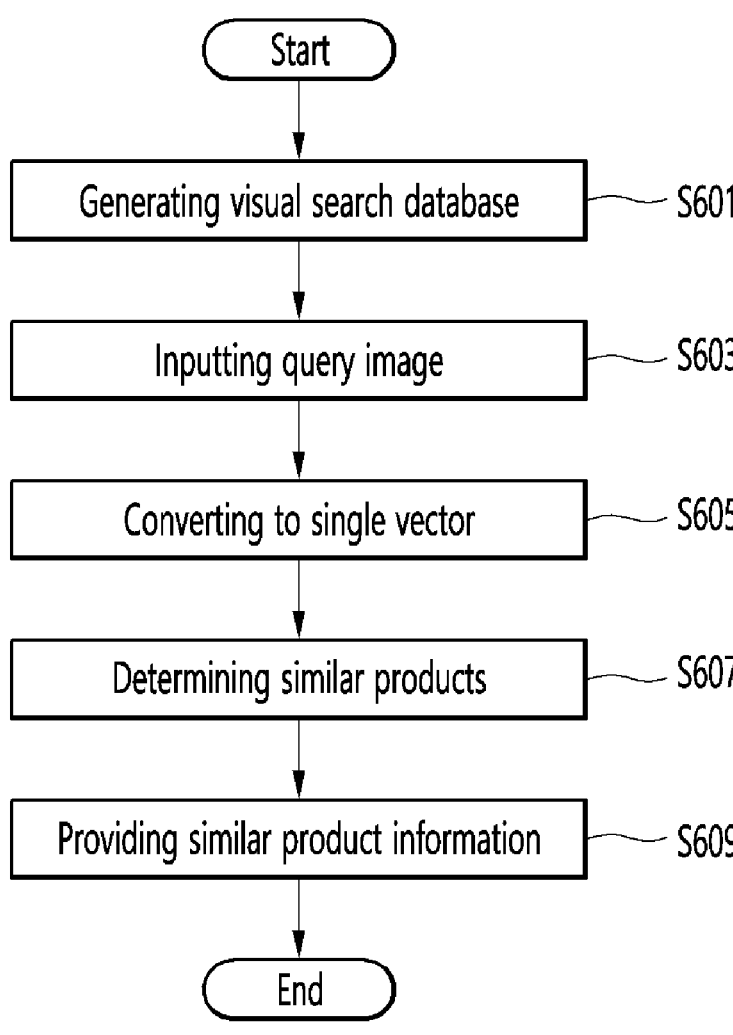
FIG. 6 is a flow diagram illustrating a process of searching for similar products according to one embodiment of the present disclosure.

FIG. 6 is a flow diagram illustrating a process of searching for similar products according to one embodiment of the present disclosure.

First, in a step S601, the similar product search server 130 may generate a visual search database. In one embodiment of the present disclosure, the step S601 may be performed according to the flowchart illustrated in FIG. 3. In one embodiment, the visual search database may store original images including at least one fashion item together with a single vector for each original image.

In a step S603, the similar product search server 130 may receive an input of a query image. In one embodiment, the similar product search server 130 may receive input from the user terminal for a query image including at least one fashion item.

Next, in a step S605, the similar product search server 130 may convert the input query image into a single vector representing the fashion attribute. In one embodiment, the similar product search server 130 may utilize a multi-task learning model to generate intermediate embedding vectors for the query image, and may fuse the generated intermediate embedding vectors to generate the single vector. In one embodiment of the present disclosure, the step S603 and the step S605 may be performed according to the flowchart illustrated in FIG. 4.

In a step S607, the similar product search server 130 may compare the single vector of the query image with each single vector stored in the visual search database and determine similar products. In one embodiment of the present disclosure, the similar product search server 130 may calculate a similarity by comparing a distance between the single vector in the query image and the single vector in the visual search database. In one embodiment, the similar product search server 130 may determine the original image for the corresponding single vector as a similar product image to the query image and determine the similar product if the calculated similarity satisfies a predetermined criterion.

Finally, in a step S609, the similar product search server 130 may provide information on the similar products. In one embodiment, the similar product search server 130 may sort the similar products in order of increasing similarity calculated in the step S607 to provide information on the similar products to the user terminal.

In the embodiments of the present disclosure described above with reference to the drawings (and throughout this specification), the user terminal 110 and the similar product search server 130 are illustrated as being implemented based on a client-server model, particularly wherein the client primarily provides user input and output functions and most other functions (particularly many functions related to similar product search) are delegated to the server, but the present disclosure is not limited thereto. It is to be appreciated that, according to other embodiments of the present disclosure, the similar product search system environment may be implemented with its functionality evenly distributed between the user terminal and the server, or it may be implemented more dependent on the application environment installed on the user terminal. Furthermore, it is to be understood that when the functions of the similar product search system are implemented by distributing them between user terminals and servers according to one embodiment of the present disclosure, the distribution of each function of the similar product search system between clients and servers may be implemented differently in accordance with embodiments. It is to be appreciated that, according to one embodiment of the present disclosure, the main functions of the similar product search server may be implemented and provided on each user terminal 110 rather than on the similar product search server 130.

Further, in the foregoing embodiments of the present disclosure, it is described as certain modules performs certain actions for convenience, but the present disclosure is not limited thereto. It is to be appreciated that in other embodiments of the present disclosure, each of the operations described above as being performed by a particular module may be performed by a different, separate module.

The programs executed by the terminals and servers described in the present disclosure may be implemented as hardware components, software components, and/or a combination of hardware components and software components. The programs may be executed by any system capable of executing computer-readable instructions.

Software may include computer programs, code, instructions, or one or more combinations thereof, and may compose processing devices to operate as desired, or may independently or collectively instruct processing devices. The software may be implemented as a computer program including instructions stored on computer-readable storage medium. Computer-readable storage media may include, for example, magnetic storage media (e.g., read-only memory (ROM), random-access memory (RAM), floppy disks, hard disks, and the like) and optical-readable medium (e.g., CD-ROM, digital versatile disc (DVD)). A computer-readable recording medium may be distributed across networked computer systems so that computer-readable code may be stored and executed in a distributed manner. The medium is readable by a computer and may be stored in memory and executed by a processor.

A computer-readable storage medium may be provided in the form of a non-transitory storage medium. In this context, 'non-transitory' means that the storage medium does not contain signals and is tangible, and does not distinguish whether the data is stored on the storage medium on a semi-permanent or temporary basis.

Further, programs according to embodiments of the present disclosure may be provided in a computer program product. The computer program may be traded between a seller and a buyer as a commodity. A computer program may include a software program and a computer-readable storage medium on which the software program is stored. For example, a computer program may include a product (e.g., a downloadable application) in the form of a software program that is distributed electronically by a device manufacturer or through an electronic marketplace (e.g., Google Play Store, App Store). For electronic distribution, at least a portion of the software program may be stored on a storage medium or may be temporarily generated. In this case, the storage medium may be the storage medium of a manufacturer's server, an e-marketplace's server, or a relay server that temporarily stores the software program.

In a system including a server and a device, the computer program may include a storage medium of the server or a storage medium of the device. Alternatively, in the presence of a third device (e.g., a smartphone) in communication with the server or the device, the computer program may include a storage medium of the third device. Alternatively, the computer program may include the software program itself that is transmitted from the server to the device or third device, or from the third device to the device. In this case, one of the server, the device, and the third device may execute the computer program to perform the methods according to the disclosed embodiments. Alternatively, two or more of the server, the device, and the third device may execute the computer program to distributedly perform the methods of the disclosed embodiments. For example, a server may execute a computer program stored on the server to control a device in communication with the server to perform methods according to disclosed embodiments. In another example, a third device may execute a computer program to control a device in communication with the third device to perform a method according to a disclosed embodiment. When the third device executes the computer program, the third device may download the computer program from a server and execute the downloaded computer program. Alternatively, the third device may execute a computer program that is provided pre-loaded to perform the methods of the disclosed embodiments.

Although embodiments have been described above by way of limited embodiments and drawings, one of ordinary skill in the art will recognize that various modifications and variations are possible from the above description. For example, suitable results may be achieved if the described techniques are performed in a different order from the methods described, and/or if components of the described computer systems, modules, and the like are combined or assembled in a different form from the methods described, or if other components or equivalents are substituted or replaced.

What is claimed is:

1. A computer-implemented method for searching for similar products using a multi-task learning (MTL) model, comprising the steps of:

converting, by using a multi-task learning model utilizing a unified backbone network, each of a plurality of original images including a fashion item into a respective single vector including at least two multi-task attributes;

generating a visual search database by storing, for each original image, the original image in association with the respective single vector; and performing a similarity search using the visual search database by comparing a query image single vector corresponding to a query image including a fashion item with the respective single vectors stored in the visual search database to obtain at least one similar product, wherein each respective single vector is a vector in which information of the fashion item is positioned in a style space, and represents each attribute of the fashion item, wherein the step of converting to a single vector including the at least two multi-task attributes comprises the steps of:

detecting, for each original image, a location of a representative item in the original image;

generating, for each original image, intermediate embedding feature vectors by embedding vectorizing the representative item in the original image in accordance with the at least two multi-task attributes; and generating one single vector positioned in the style space by fusing the intermediate embedding feature vectors, and wherein the generating intermediate embedding feature vectors comprises the step of:

generating, for the at least two multi-task attributes, intermediate embedding feature vectors having different sizes determined based on a task complexity associated with the respective multi-task attributes.

2. The method of claim 1, wherein the step of converting to a respective single vector including the at least two multi-task attributes further comprises the step of:

weighting the intermediate embedding feature vectors based on the associated multi-task attribute.

3. The method of claim 1, wherein the step of performing the similarity search comprises the steps of:

receiving a query image including a fashion item;

detecting a location of a representative item in the query image;

converting the representative item in the query image into a query image single vector including at least two multi-task attributes by using the multi-task learning model;

calculating a similarity between the query image single vector and each of the single vectors stored in the visual search database; and providing at least one original image associated with the single vector stored in the visual search database, which has a similarity satisfying a predetermined criterion.

4. The method of claim 3, wherein the step of converting the representative item in the query image into a query image single vector including at least two multi-task attributes comprises the steps of:

generating intermediate embedding feature vectors of the query image by embedding vectorizing the representative item of the query image in accordance with at least two multi-task attributes;

weighting the intermediate embedding feature vectors of the query image based on the associated multi-task attribute; and generating one single vector by fusing the weighted intermediate embedding feature vectors of the query image.

5. The method of claim 1, wherein the multi-task attribute includes at least two of a category, a length, a sleeve length, a pattern, a style, a shape, a color, a material, a fit, a detail, and a neckline of the fashion item.

6. A non-transitory computer-readable recording medium having stored thereon a computer program for executing the method of claim 1.

7. A system for searching for similar products using a multi-task learning (MTL) model, comprising:

one or more processors; and a memory storing instructions that, when executed by the one or more processors, cause the one or more processors to:

convert, by using a multi-task learning model utilizing a unified backbone network, each of a plurality of original images including a fashion item into a respective single vector including at least two multi-task attributes;

generate a visual search database by storing, for each original image, the original image in association with the respective single vector; and perform a similarity search using the visual search database by comparing a query image single vector corresponding to a query image including a fashion item with the respective single vectors stored in the visual search database to obtain at least one similar product, wherein each respective single vector is a vector in which information of the fashion item is positioned in a style space, and represents each attribute of the fashion item, wherein causing the one or more processors to convert each of the plurality of original images into the respective single vector comprises causing the one or more processors to:

detect, for each original image, a location of a representative item in the original image;

generate, for each original image, intermediate embedding feature vectors by embedding-vectorizing the representative item in the original image in accordance with the at least two multi-task attributes; and generate the respective single vector positioned in the style space by fusing the intermediate embedding feature vectors, and wherein generating the intermediate embedding feature vectors comprises generating, for the at least two multi-task attributes, intermediate embedding feature vectors having different sizes determined based on a task complexity associated with the respective multi-task attributes.

* * * * *